Sept. 16, 1924.
W. C. SOULE
1,509,002
DOUBLE LOCKING HOOK AND EYE
Filed Feb. 27, 1923
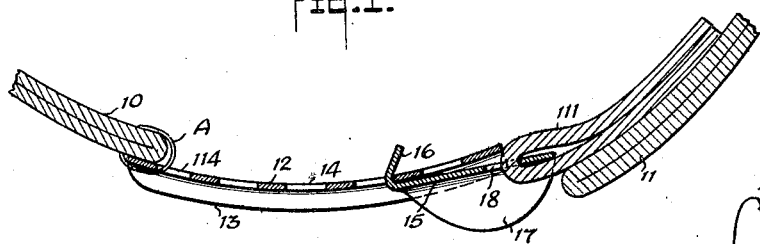
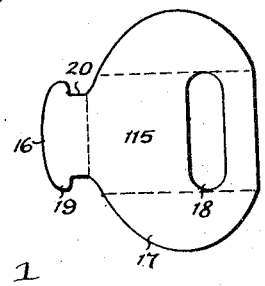
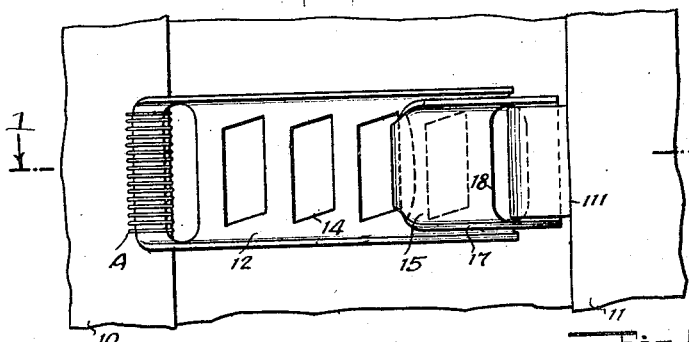
WITNESSES
INVENTOR
WELLING C. SOULE
BY
ATTORNEYS Patented Sept. 16, 1924.

1,509,002

UNITED STATES PATENT OFFICE.

WELLING C. SOULE, OF SAVANNAH, NEW YORK.

DOUBLE-LOCKING HOOK AND EYE.

Application filed February 27, 1923. Serial No. 621,598.

*To all whom it may concern:*

Be it known that I, WELLING C. SOULE, a citizen of the United States of America, and a resident of Savannah, in the county of Wayne and State of New York, have invented a new and Improved Double-Locking Hook and Eye, of which the following is a description.

My invention relates to a hook and eye fastening means which while adapted for use for fastening garments generally and other articles is more particularly intended for fastening leggings, galoshes, and similar articles.

The general object of the invention is to provide coacting hook and eye elements that will effect a double locking engagement.

Reference is to be had to the accompanying drawings forming a part of this specification, it being understood that the drawings are merely illustrative of examples of the invention.

Figure 1 is a section on the line 1—1, Figure 2;

Figure 2 is a plan view;

Figure 3 is a plan of the blank for forming the hook member;

Figure 4 is a plan view of the hook and eye with the element having the eyes modified;

Figure 5 is a view similar to Figure 4 but with a further modification of the eyes;

Figures 6 and 8 are plan views of fragments of the eye elements of the fastener showing further modifications of the eyes;

Figure 7 is a perspective view of a modified form of a hook member;

Figure 9 is a perspective view of a further modification of the hook element.

In carrying out my invention in practice the respective elements of the fastener are secured to the ends 10, 11 of a legging or other article. The eye element designated generally by the numeral 12, has side flanges 13 for giving a locking effect and has transverse holes or eyes 14. One end of the element 12 is secured by stitching A to one edge of the legging.

The hook element is designated generally by the numeral 15, 16 indicating the hook, and 17, wings or flanges at the sides for convenience in manipulating and for coacting with flanges 13 to lock or hold the elements 12 and 16 in engagement. I have shown as one means for securing the hook element 15 a loop 111 passing through a hole or slot 18 in said element.

The eyes 14 and the modifications hereinafter described are so formed that the greatest dimension thereof is oblique to the axis of the element 12 in which the said eyes are formed, the greatest distance being between two diagonally opposite corners or portions of the eye. In Figures 1 and 2 the eyes 14 are rhomboidal to produce the greatest dimension obliquely.

In Figure 4 the eye element, 40, has rhomboidal eyes or holes 41 of opposite obliquity to the eyes 14, the ends of the eye being reversely inclined to the inclination of the eyes 14.

In Figure 5 the eye element 50 has oblong eyes 51 generally rectangular and with a notch 52 at one corner and oblique to the axis of the oblong figure.

In Figure 6 the eye element 60 has eyes 61 with oblique notches 62 at the four corners.

In Figure 8 the eye element 70 has oval eyes or holes 71 each with an oblique notch 72 complementary thereto.

In Figure 7 the hook element 80 having the hook 81 has prongs 82 stamped up from the material of said element for fastening the element onto the article to be fastened. The element 80, furthermore, has a single side flange 83 for manipulating the element in fastening and unfastening.

The hooks 16 and 81 have respectively necks or shanks 20 and 120, the hook extending unequally beyond said necks, one end 93 being longer than the other. The longer end of the hook may be at either side of the fastener element. In Figure 9 the hook 91 on the plate element 90 extends at one side of said element 192, a less distance than at the opposite side 193, the longer and shorter ends being reversed from the hooks 16 and 81.

By extending the hook more at one side than at the other, accidental disengagement of the fastener elements is more effectively prevented. The end members of the hooks by engagement with the flanges 13 are permitted only a limited side play to hold the elements in engagement.

In practice the hook 16, 81, or 91, in order to engage it with an eye of an eye element, is disposed obliquely to said eye and after passing through the eye, the hook is brought into a plane at right angles to the axis of the eye element to lie parallel with one wall or edge of the eye. Thus, accidental disengagement is made impossible, it being necessary to deliberately again dispose the hook oblique to the eye in order to offset disengagement.

I would state in conclusion that while the illustrated examples constitute practical embodiments of my invention, I do not limit myself strictly to the exact details herein illustrated, since, manifestly, the same can be considerably varied without departure from the spirit of the invention as defined in the appended claims.

Having thus described my invention, I claim:

1. A fastening device, comprising two members, longitudinal flanges on both members and one member constructed to fit within the other and held by the flanges against accidental lateral displacement or angular movement, a hook on one of said members, and the other of said members having an eye therein so shaped as to permit entrance and exit of the hook only when one of the members is positioned at an angle to the other.

2. A fastening device, comprising two members, and one member being narrower than the other, flanges at the edges of the wider member and the narrower member constructed to fit between the flanges of the other member and held thereby against accidental lateral or angular movement, a hook on the narrower member, and the wider member having a longitudinal series of hook-receiving eyes therein of a shape to permit entrance and exit of the hook only when the members are at an angle to each other.

WELLING C. SOULE.